Patented Sept. 12, 1944

2,358,004

UNITED STATES PATENT OFFICE 2,358,004

TREATMENT OF TALL OIL

Russell G. Dressler, Middle River, Md., Robert E. Vivian, Los Angeles, Calif., and Torsten Hasselstrom, Savannah, Ga.

No Drawing. Application March 11, 1940, Serial No. 323,479

13 Claims. (Cl. 260—97.5)

This invention pertains to the treatment of tall oil for producing stable and commercially useful products.

Crude tall oil is a by- or waste-product of the sulfate or soda processes of the pulp and paper industry. In general, the term is associated with the sulfate process.

Tall oil is a complex material, the chemical composition of which is little known. It contains unsaturated fatty acids in simple or polymerized form, liquid and solid resin acids including some identifiable individuals as well as others virtually unknown as to structure, and unsaponifiable matter containing sterols. Any attempted quantitative analysis of the three mentioned principal constituent bodies of tall oil results only in an arbitrary classification. It has been shown that tall oil is a material which is specific in its character and chemical properties, and not to be duplicated by a simple blending of ingredients.

Samples of tall oil vary considerably in composition, with respect to content of resin acids, fatty acids, and unsaponifiable matters. Typical specimens of tall oil as produced in the United States show that crude tall oil may contain from 30 to 65 percent of resin acids, 40 to 60 percent of fatty acids, and up to 10 percent of unsaponifiable matters; while refined and bleached (or distilled) tall oil may contain, for example, from 35 to 40 percent of resin acids, 50 to 60 percent of fatty acids, and up to 10 percent of unsaponifiable matter. Many constituents of tall oil are individually unstable in that they are susceptible to oxidation, etc., and the material is not directly employable for most normal uses of either resin acids or fatty acids. The present procedure has been found advantageous in effecting stabilization of such materials in the crude, semi-refined and refined states. By way of illustration, a crude tall oil may contain 33.6 percent resin acids, 56 percent fatty acids, 8.3 percent unsaponifiable matter, iodine Number 166 (modified Wijs), thiocyanogen Number 74.4, acid Number 154, melting point 20 degrees C., sulfur content .08 percent; while a refined and bleached (distilled) tall oil may comprise 38.5 percent resin acids, 51 percent fatty acids, 4.6 percent unsaponifiable matter, iodine Number 161, thiocyanogen Number 64, acid Number 164, melting point 19 degrees C., sulfur content .06 percent.

Crude tall oil has found little application in industry due to its black or dark brown color, liquidity, and stickiness, and due to its non-uniformity of chemical composition. The odor is that of pine oil products, along with a distinct smell of mercaptans, and hence is offensive and renders the product unsuitable for general commercial purposes. This material normally appears on the market in a semi-solid state, as a viscous liquid containing varying amounts of suspended solid ingredients, which makes it difficult to handle commercially. The product known to commerce as "distilled tall oil," although it may have been improved somewhat as to color, being orange to brown, still has the disadvantages of being of pine or aromatic odor (with a definite indication of mercaptans), sticky, and non-uniform in physical and chemical composition.

According to this invention, tall oil is pretreated in the presence of a catalyst capable of effecting the stabilization of the resin constituents by a disproportionation of hydrogen in the resin acid molecules. The product thereof is then subjected to esterification, and to separation in the presence of selective solvents, whereby a product is gained which contains esters of tall oil fatty acids; and thereupon a hydrogenation thereof is effected for reducing the unsaturation and producing a final product of great stability and greatly benefited color and odor. The resin acids, separated in the process, are stable and therefore also constitute a commercially-valuable product.

The hydrogenated fatty acid esters produced in this process can be employed similarly to the methyl or ethyl oleate and stearate materials now in commerce. They may be employed directly, or hydrolyzed for liberating the corresponding fatty acid or a mixture of fatty acids, dependent upon the degree of hydrogenation which has been accomplished. The resin acids constitute a valuable by-product, and can be used to replace rosin and other natural resins, with the advantage of this great stability.

Example I 1500 grams of crude tall oil were heated at 180-240 degrees C., with 30 grams of powdered nickel. The content of resin acids of the empiric formula $C_{20}H_{30}O_2$ is thus caused to decrease, and after two hours' treatment at 180-200 degrees C., about 4 percent of the total resin acids (and about 8 percent upon heating for two hours more at 240 degrees C.) have an empiric formula $C_{20}H_{28}O_2$; and likewise resin acids of empiric formula $C_{20}H_{32}O_2$ are now present: these latter acids (which may be referred to as the $H_{28}$ and $H_{32}$ acids) having a greatly improved stability over the initial $C_{20}H_{30}O_2$ resin acids and serving to render the total content of resin acids far less responsive to penetration of other atoms such as occurs by oxidation, hydrogenation, etc. The tall oil was decanted to separate it from the nickel dust, and was then esterified by dissolving 1000 grams of this pre-treated tall oil in 1000 cc. of methanol and about 50 cc. of concentrated sulfuric acid were added. The sulfuric acid is herein termed an esterifying catalyst. The mixture was heated to boiling, with refluxing, for about 20 to 30 minutes. About 2000 cc. of water and 1000 cc. of benzol were then added, and the solution thoroughly mixed. After settling, the lower aqueous layer was separated from the upper benzol layer: the aqueous layer contains sugars and water soluble ligneous matters (usually less than 5 percent), sulfuric acid from the treatment, and excess methanol. The benzol layer was shaken with a solution containing the theoretically equivalent amount of sodium hydroxide added in about 1 or 2 percent concentration. Caution was taken to keep the mixture neutral or slightly alkaline in order to avoid formation of emulsions during the procedure of mixing. On standing, two layers were separated, and the lower (second) aqueous layer containing the sodium salts of the resin acid components of tall oil was separated from the upper layer which contains a benzol solution of the methyl esters of the fatty acids, and also the unsaponifiables, along with traces of resin acids and resinates. From the benzol solution, the benzol was stripped off completely or partially by means of distillation at atmospheric pressure or in vacuum. The residue (fatty acid esters and unsaponifiable matter) was then subjected to hydrogenation three times at 200 pounds hydrogen pressure for one-half hour each at 180 degrees C., using one-half percent of nickel in finely divided form as a catalyst each time and filtering off spent catalyst before adding the fresh catalyst. The product resulting from the above treatments consisted mainly of hydrogenated fatty acid esters with some unsaponifiable matter admixed; the general mixture having a melting point of (about) 30 degrees C., and the treatments have eliminated the mercaptans and pine odors. The lower (second) aqueous layer, which was separated, contains the sodium salts of the modified resin acid components of tall oil, and from which the resin acids may be separated in free state, if desired, by simple addition of a mineral acid. The resin acids are stable, and are free from mercaptans and pine odors. The total yield from 1500 grams of crude tall oil is substantially 600 grams of methyl esters of fatty acids, 750 to 825 grams of resin acids, and 150 grams of residue (mainly unsaponifiable matters).

The lower (second) aqueous layer may be employed, as such or in the form of its dried constituents, as a detergent or emulsifying agent, as it comprises the sodium soaps of a stabilized mixture including the modified resin acids, and usually also including a small quantity of fatty acid soaps and esters, and likewise contains phenols or phenolates which are effective as penetrating agents and antiseptics. Furthermore, these materials, as prepared, contain acids of lignoceric type, normally in the form of the alkali metal salts, which likewise are of assistance in the action of the detergent material. Specifically, for the present and following examples, the solid residue from this (second) aqueous layer has an acid number of about 130 to 150, dependent upon the tall oil employed and also upon benzol or like selected solvents employed in the purification; and the composition consists of a mixture of alkali metal salts of resin acids, of which dehydroabietic acid forms 4 to 35 percent, and in which the quantity of Steele's abietic acid depends upon the length and conditions of treatment for disproportionation, and for a stabilized composition should be less than 30 percent.

The nickel powder used in the disproportionation can then be immediately utilized for a further treatment of additional tall oil. In employing a less finely divided nickel, such as nickel shavings or shot, greater relative quantities should be employed, even as high as 1000 grams per thousand grams of tall oil; but it is usually preferred to insure uniformity of treatment by an agitating operation such as shaking or stirring. When large surfaces are exposed, it is preferred to protect the surfaces of the material undergoing this pre-treatment by utilization of a non-oxidizing atmosphere such as carbon dioxide, nitrogen or the rare gases which are particularly advantageous where a maximum conversion to dehydrogenated resin acids such as $C_{20}H_{28}O_2$ is to be effected, as these atmospheres are in themselves non-hydrogenating.

It is likewise possible to employ spent or unspent hydrogenating catalysts, such as finely divided nickel or nickel distributed on a carrier for accomplishing this pre-treatment: platinum, palladium and cobalt, as examples of other hydrogenating catalysts, may likewise be employed.

*Example II*

1500 grams of a typical crude tall oil are mixed with 50 grams of an active bleaching clay such as is used for vegetable oils. This mixture is heated to and maintained at 180 to 200 degrees C., and agitated by stirring for a period of fifteen minutes, while a non-oxidizing atmosphere (carbon dioxide or nitrogen) is maintained in contact therewith. As in Example I, the initial resin acids have been stabilized by disproportionation, and about two percent of $C_{20}H_{28}O_2$ resin acids are present. (When the heating is continued for two hours more at 240 degrees C., about 7 percent thereof are present.) The tall oil is filtered free from the clay and the material adsorbed therein, and is found to be substantially unchanged in color. This pre-treated and filtered tall oil was subjected to the selective solvent separation and purification as in Example I, and the benzol eliminated. The residue was then hydrogenated three times at 200 pounds hydrogen pressure and at 180 degrees C. for time intervals of ½ hour each, each time employing ½ percent of fresh nickel catalyst, filtering off the spent catalyst before adding the fresh portion. The hydrogenated product was similar to that of Example I.

*Example III*

1500 grams of crude tall oil were heated to about 180–200 degrees C., and 30 grams of spent nickel catalyst were added. The mixture was kept at 180 to 200 degrees C. for two hours. As before, the initial resin acids have been stabilized by disproportionation, and about one percent of $C_{20}H_{28}O_2$ resin acids are present. (When the heating is continued for two hours more at 240 degrees C., the product contains 6 percent of such acids.) The product is subjected to the selective solvent separation and purification as in Example I, and the benzol eliminated. The residue was then hydrogenated four times at 200 pounds hydrogen pressure for ½ hour each at 180 degrees C., using ½ percent of nickel as a catalyst each time, and filtering off spent catalyst before adding the fresh catalyst. The product was similar to that of Example I.

Unspent nickel catalyst, and spent or unspent palladium, platinum and cobalt catalyst, with or without carriers, can be similarly employed.

*Example IV*

1500 grams of crude tall oil were heated to about 180 degrees C. and 30 grams of nickel dust or other catalyst of Example III were added. The mixture was kept at 180 to 240 degrees C. for two hours. It was permitted to cool and was left standing at room temperature for 2 to 10 days until about 10 to 45 percent of the solids had settled out. This solid matter was removed by filtration, and contained 12 percent of the $C_{20}H_{28}O_2$ acid. The liquid part was subjected to selective solvent separation and purification as in Example I. The benzol was eliminated, and the residue was subjected to hydrogenation, utilizing three hydrogenating treatments of ½ hour each at 180 degrees C. with ½ percent of nickel as a catalyst each time. The resulting hydrogenated product was similar to that of Example I.

Such pre-treatments with disproportionation catalyst are preferably accomplished at temperatures in excess of 100 degrees C., and for a period of at least fifteen minutes, to obtain at least a partial disproportionation of hydrogen in at least one sensitive molecule as a preliminary operation. Disproportionation action appears to begin even with as little as one one-hundredth of a percent of catalyst.

*Example V*

The separated fatty esters and unsaponifiable material as set out in Example I, after stripping of benzol, were subjected to fractional distillation in vacuum at 4 mm. pressure. 500 grams of crude tall oil yielded about 200 grams of methyl esters boiling at about 185–200 degrees C. and about 50 grams of residue. (The residue left upon such fractionation of the fatty acid esters of tall oil is dark in color and semi-solid and contains the sterols and oil-soluble vitamins of the pine tree.) These esters (liquid at room temperature and of iodine number 129.0) were subjected to catalytic hydrogenation with 1 percent of unsupported nickel catalyst, for one hour at 150 degrees C. and 1000 pounds pressure per square inch. Then 2 percent more of unsupported nickel catalyst was added and hydrogenation continued for one hour at 175 degrees C. and 1000 pounds pressure per square inch. The melting point of the stearic acid methyl ester obtained was 35 degrees C. The iodine number of this product was 17.8. (The theoretical melting point of pure methyl stearate is about 39 degrees C.) The color of the product was almost white, having only a slight yellowish tinge.

*Example VI*

A mixture of methyl esters of tall oil fatty acids prepared as in the earlier examples and having a melting point of 13.0 degrees C. and iodine number of 130 was hydrogenated for 6 hours with 1 percent nickel catalyst at 180 degrees C and 175 pounds pressure, and gave a final product melting at 16 degrees C. and an iodine number of 82. The product was white to light yellow in color; and comprised about 30 percent of methyl stearate and 70 percent of methyl oleate.

*Example VII*

A sample of tall oil methyl esters as used in Example VI was hydrogenated with 2 percent of nickel catalyst for 3 hours at 180 degrees C. and 175 pounds pressure. The final product had a melting point of 26 degrees C. and an iodine number of 55. The color of the product was yellowish white; and it comprised substantially 60 percent of methyl stearate and 40 percent of methyl oleate.

*Example VIII*

Tall oil fatty acid esters as used in Example VI were hydrogenated with 2 percent nickel for 5 hours at 180 degrees C. and 265 pounds pressure, and gave a product melting at 29 degrees C. and having an iodine number of 41. The color of the product was yellowish white; and it comprised about 70 percent of methyl stearate and 30 percent of methyl oleate.

The aqueous solution containing the sodium salts of rosin acids obtained in esterification of crude tall oil was acidified and the free acids collected. After removing the water of solution, a rosin is obtained which is rich in dehydroabietic acid. The resin acids thus obtained from the solutions of Examples I to IV contain about 1–25 percent dehydroabietic acid ($C_{20}H_{28}O_2$).

Ethyl and similar esters may be prepared, separated and purified in like ways; but the methyl and ethyl esters are preferred, as a better separation occurs with them.

Likewise, other organic solvents of fatty acid esters may be employed for the separation.

The hydrogenation of the fatty acid esters is preferably effected under increased pressure, usually of the order of 200 to 600 pounds per square inch, in order to obtain a rapid addition and to avoid any discoloration by action of catalyst.

It is obvious that the invention is not limited to the specific illustrative examples, but that it may be practiced in many ways within the scope of the appended claims.

We claim:

1. The process of preparing a stable fatty acid compound from tall oil, which comprises effecting disproportionation of resin acids by heating with a disproportionating catalyst at 180 to 200 degrees C. for reducing the proportion of Steele's abietic acid below 30 percent, effecting esterification of fatty acids by heating the tall oil with an alcohol in the presence of an esterifying catalyst, agitating with a water-immiscible organic solvent of fatty acid esters and permitting aqueous and organic solvent layers to separate, agitating the organic solvent layer with an aqueous caustic alkali solution and permitting the aqueous and organic solvent layers to separate, removing the organic solvent layer, and recovering the fatty acid compound from the said organic solvent layer.

2. The process of preparing a stable fatty acid compound from tall oil, which comprises heating a mixture consisting of the tall oil and a disproportionating catalyst to a temperature of substantially 180 degrees C. for reducing below 30 percent the proportion of Steele's abietic acid in the resin content thereof, separating from the catalyst and effecting esterification of fatty acids by heating with an alcohol in the presence of an esterifying catalyst, agitating with a water-immiscible organic solvent of fatty acid esters and permitting aqueous and organic solvent layers to separate, agitating the organic solvent layer with an aqueous caustic alkali solution and permitting the aqueous and organic solvent layers to separate, removing the organic solvent layer, and recovering the fatty acid compound from the said organic solvent layer.

3. The process of preparing a stable fatty acid compound from tall oil, which comprises heating the tall oil with finely divided nickel at substantially 180 to 240 degrees C. until a stabilizing conversion to dehydroabietic acid has occurred, separating from the catalyst and effecting esterification of fatty acids by heating with an alcohol in the presence of an acid esterifying catalyst, agitating with a water-immiscible organic solvent of fatty acid esters and permitting aqueous and organic solvent layers to separate, agitating the organic solvent layer with an aqueous caustic alkali solution and permitting the aqueous and organic solvent layers to separate, removing the organic solvent layer, and recovering the fatty acid compound from the said organic solvent layer.

4. The process of preparing a stable fatty acid compound from tall oil, which comprises heating a mixture consisting of the tall oil and a disproportionating catalyst at substantially 180 to 240 degrees C. for reducing below 30 percent the proportion of Steele's abietic acid in the resin content thereof, permitting to stand at substantially room temperature until 10 to 45 percent of solids settle out, and effecting esterification of fatty acids of the liquid fraction by heating with an alcohol in the presence of sulfuric acid, agitating with a water-immiscible organic solvent of fatty acid esters and permitting aqueous and organic solvent layers to separate, agitating the organic solvent layer with an aqueous caustic alkali solution and permitting the aqueous and organic solvent layers to separate, removing the organic solvent layer, and recovering the fatty acid compound from the said organic solvent layer.

5. The process of preparing a stable fatty acid compound from tall oil which comprises heating a mixture consisting of the tall oil and a disproportionating catalyst at substantially 180 to 240 degrees C. until a stabilizing conversion to dehydroabietic acid has occurred, separating the liquid portion from the catalyst, esterifying the fatty acids of liquid fraction, and agitating with a water-immiscible organic solvent of fatty acid esters, treating with an aqueous alkaline solution, permitting the mixture to separate into aqueous and organic solvent layers, and eliminating the solvent from the organic solvent layer.

6. The process of preparing a fatty acid compound from tall oil, which comprises heating the tall oil at substantially 180 to 240 degrees C. in the presence of a disproportionating catalyst for effecting disproportionation of the resin acids therein and until a stabilizing conversion thereof has occurred without substantial change of acid number, effecting esterification of the fatty acids by heating the tall oil with an alcohol in the presence of an esterifying catalyst, agitating with a water-immiscible organic solvent of the fatty acid esters and permitting aqueous and organic solvent layers to separate, agitating the organic solvent layer with an aqueous caustic soda solution and again permitting aqueous and organic solvent layers to separate, removing the organic solvent layer, and recovering the fatty acid compound from the said organic solvent layer.

7. The process of preparing a fatty acid compound from tall oil, which comprises heating a mixture consisting of the tall oil and a disproportionating catalyst until a stabilizing conversion to dehydroabietic acid has occurred, the temperature being maintained at substantially 180 to 200 degrees C. and below the point of substantial destructive distillation, separating from the catalyst and effecting esterification of fatty acids by heating with an alcohol in the presence of an esterifying catalyst, agitating with a water-immiscible organic solvent of fatty acid esters and permitting aqueous and organic solvent layers to separate, agitating the organic solvent layer with an aqueous caustic alkali solution and again permitting aqueous and organic solvent layers to separate, and recovering the fatty acid compound from the latter solvent layer.

8. The process of preparing a fatty acid compound from tall oil, which comprises heating the tall oil with finely divided nickel at a temperature of substantially 180 degrees and in the presence of a non-oxidizing atmosphere of a gas selected from the group consisting of carbon dioxide, nitrogen and the rare gases, and thereby effecting disproportionation in the resin acid components until the proportion of Steele's abietic acid is reduced below 30 percent, separating from the catalyst and effecting esterification of fatty acids by heating with an alcohol in the presence of an esterifying catalyst, agitating with a water-immiscible solvent of the fatty acid esters and permitting aqueous and organic solvent layers to separate, agitating the organic solvent layer with an aqueous caustic alkali solution and again permitting aqueous and organic solvent layers to separate, and recovering the fatty acid compound from the latter organic layer.

9. The process of preparing a fatty acid compound from tall oil, which comprises heating a mixture consisting of the tall oil and a disproportionating catalyst at a temperature of substantially 180 to 200 degrees C. and thereby effecting conversion of Steele's abietic acid to dehydroabietic acid, permitting the mixture to stand at substantially room temperature until 10 to 45 percent of solids settle out, heating the liquid fraction with an alcohol in the presence of an esterifying catalyst for effecting esterification of fatty acids, agitating with a water-immiscible organic solvent of the fatty acid esters and permitting aqueous and organic solvent layers to separate, agitating the organic solvent layer with an aqueous caustic alkali solution and again permitting aqueous and organic solvent layers to separate, and recovering the fatty acid compound from the latter organic solvent layer.

10. The process of preparing a stable fatty acid compound from tall oil, which comprises effecting disproportionation of resin acids by heating with a disproportionating catalyst at 180 to 200 degrees C. for reducing the proportion of Steele's abietic acid below 30 percent, effecting esterification of fatty acids by heating the tall oil with an alcohol in the presence of an esterifying catalyst, agitating with a water-immiscible organic solvent of fatty acid esters and permitting aqueous and organic solvent layers to separate, agitating the organic solvent layer with an aqueous caustic alkali solution and permitting the aqueous and organic solvent layers to separate, and recovering the fatty acid compound from the organic solvent layer.

11. The process of preparing a stable fatty acid compound from tall oil, which comprises heating a mixture consisting of the tall oil and a disproportionating catalyst to a temperature of substantially 180 degrees C. for reducing below 30 percent the proportion of Steele's abietic acid in the resin content thereof, separating from the catalyst and effecting esterification of fatty acids by heating with an alcohol in the presence of an esterifying catalyst, agitating with a water-immiscible organic solvent of fatty acid esters and permitting aqueous and organic solvent layers to separate, agitating the organic solvent layer with an aqueous caustic alkali solution and permitting the aqueous and organic solvent layers to separate, and recovering the fatty acid compound from the organic solvent layer.

12. The process of preparing a stable fatty acid compound from tall oil, which comprises heating the tall oil with finely divided nickel at substantially 180 to 240 degrees C. until a stabilizing conversion to dehydroabietic acid has occurred, separating from the catalyst and effecting esterification of fatty acids by heating with an alcohol in the presence of an acid esterifying catalyst, agitating with a water-immiscible organic solvent of fatty acid esters and permitting aqueous and organic solvent layers to separate, agitating the organic solvent layer with an aqueous caustic alkali solution and permitting the aqueous and organic solvent layers to separate, and recovering the fatty acid compound from the organic solvent layer.

13. The process of preparing a stable fatty acid compound from tall oil, which comprises heating a mixture consisting of the tall oil and a disproportionating catalyst at substantially 180 to 240 degrees C. for reducing below 30 percent the proportion of Steele's abietic acid in the resin content thereof, permitting to stand at substantially room temperature until 10 to 45 percent of solids settle out, and effecting esterification of fatty acids of the liquid fraction by heating with an alcohol in the presence of sulfuric acid, agitating with a water-immiscible organic solvent of fatty acid esters and permitting aqueous and organic solvent layers to separate, and recovering the fatty acid compound from the organic solvent layer.

RUSSELL G. DRESSLER.
ROBERT E. VIVIAN.
TORSTEN HASSELSTROM.